Figure 1:
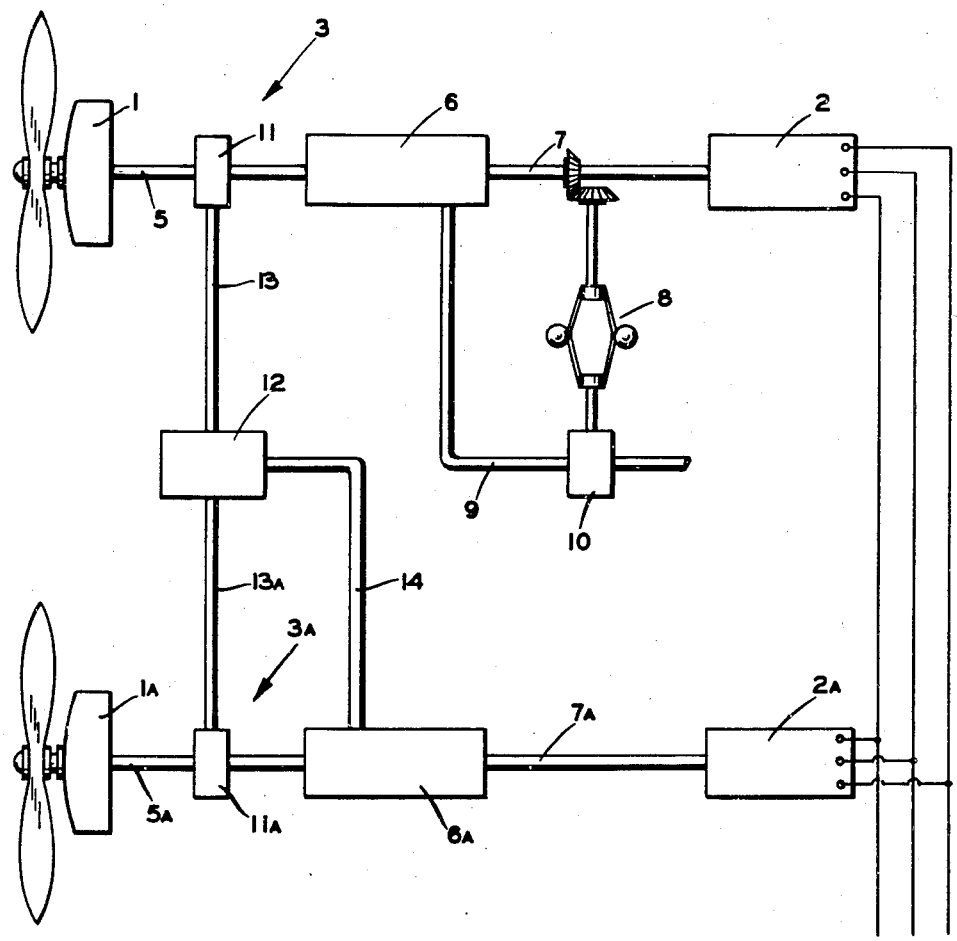

Nov. 30, 1948.  D. M. LAWRENCE  2,455,070
SYNCHRONIZING MECHANISM

Filed July 17, 1946  3 Sheets-Sheet 1

INVENTOR
DONALD M. LAWRENCE
BY
ATTORNEY

Nov. 30, 1948.   D. M. LAWRENCE   2,455,070
SYNCHRONIZING MECHANISM

Filed July 17, 1946   3 Sheets-Sheet 2

INVENTOR
DONALD M. LAWRENCE
BY
ATTORNEY

Nov. 30, 1948.　　　D. M. LAWRENCE　　　2,455,070
SYNCHRONIZING MECHANISM

Filed July 17, 1946　　　3 Sheets-Sheet 3

INVENTOR
DONALD M. LAWRENCE
BY
ATTORNEY

Patented Nov. 30, 1948

2,455,070

UNITED STATES PATENT OFFICE 2,455,070

SYNCHRONIZING MECHANISM

Donald Malcolm Lawrence, Wood-Ridge, N. J., assignor to Bendix Aviation Corporation, Teterboro, N. J., a corporation of Delaware Application July 17, 1946, Serial No. 684,384

9 Claims. (Cl. 322—36)

1

The present invention relates to synchronizing mechanism and more particularly to novel means whereby aircraft alternators may be synchronized to run in parallel.

Heretofore, effort has been made to drive two or more alternators by some form of constant speed gear box such as the slipping clutch type or other type of variable speed control, so as to effect a relatively constant speed output with a varying speed input. It is necessary in paralleling alternators to have their speeds exactly identical and in phase within a few electrical degrees.

While any form of the above-mentioned types of constant speed drives may theoretically be made to run at constant speed, in actual practice serious difficulties are encountered, in that small differentials of speed effect out of phase relationships between the several alternators.

It is known that in paralleling alternators, the load on each alternator is a function of the lag or lead of the alternators in electrical degrees, that is, as one alternator tends to lead, it carries a larger percentage of the load. If this lead is very great, it then carried the full load of the entire system.

It is an object of the present invention, therefore, to provide a practical and accurate speed control system, whereby it is possible to parallel engine driven alternators, particularly for use in aircraft where engine speeds vary over a considerable range.

In this connection, if we change our concept of paralleling to think of one engine, constant speed gear box and alternator combination, as being a master unit arranged so as to run closely to the desired speed, we may then set up another engine, gear box and alternator combination or slave unit that, instead of being responsive to speed, is arranged to be responsive to load alone. Consequently, in order that the second or slave alternator carry any load, it must be running in parallel with the first alternator.

An object of the present invention is to provide novel means for effecting the foregoing operation.

Another object of the invention is to provide a novel control system in which there is a speed sensitive control which changes the ratio of input to output and which may be in the form of a displaceable element which varies the ratios of the speeds of the input and the output to the desired value and the system arranged so as to be sensitive to the torque passing through the drive mechanism for the several alternators so as to operate the first alternator in response to speed alone and operate the second alternator so as to maintain

2 a predetermined division of load or torque between the alternators so that the load may be divided proportionately and the alternators driven in synchronism.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

In the drawings:

Figure 1 is a schematic drawing illustrating a system embodying the present invention.

Figure 2:
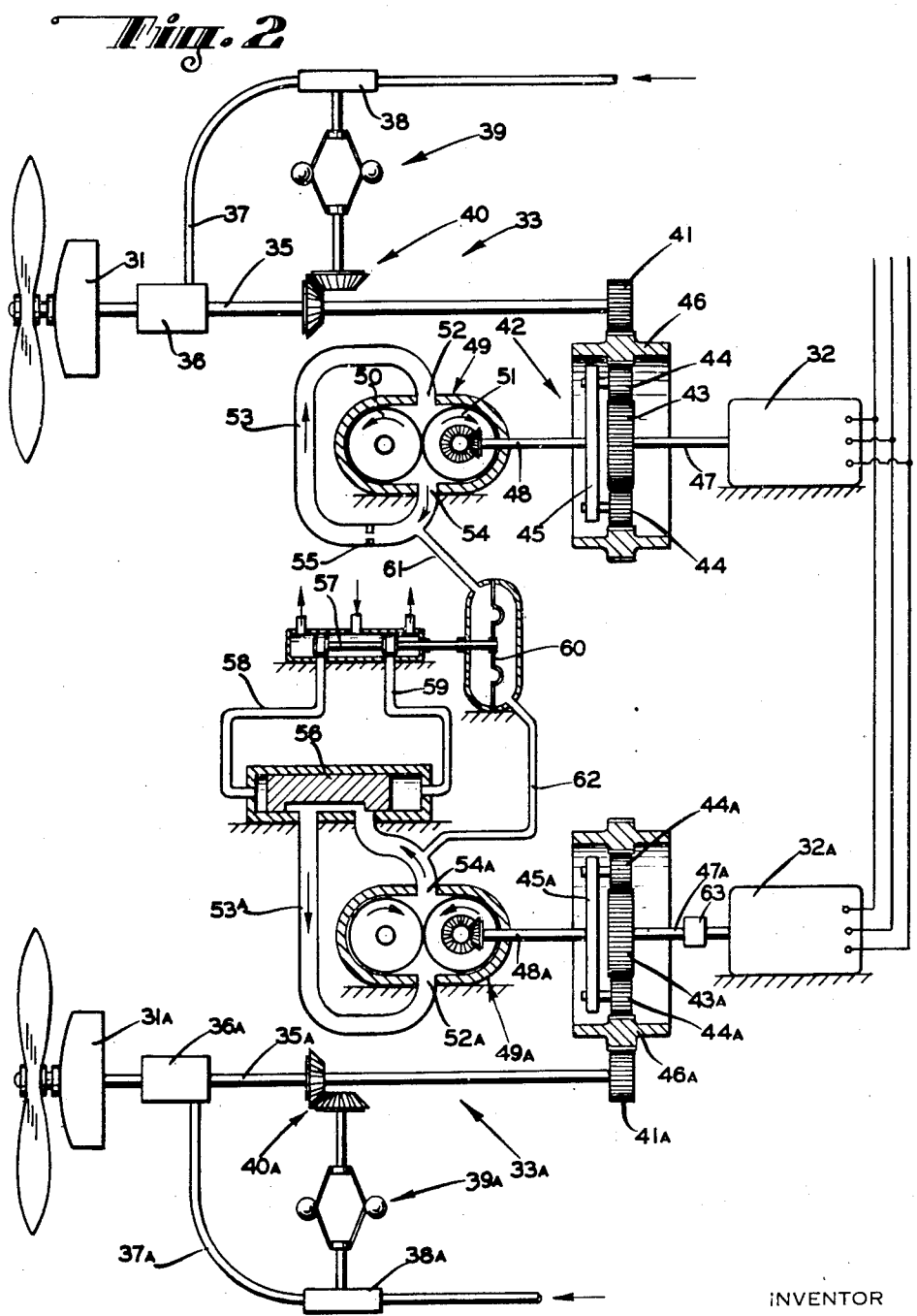

Figure 2 is a schematic drawing illustrating a second form of the invention in which each alternator is driven through a constant speed gear box, and a planetary mechanism including a hydraulic braking device controlled by a differential pressure responsive mechanism so arranged that the speed of one alternator is so controlled that the torque thereof balances the torque measured by the braking pressure of the other alternator.

Figure 3:
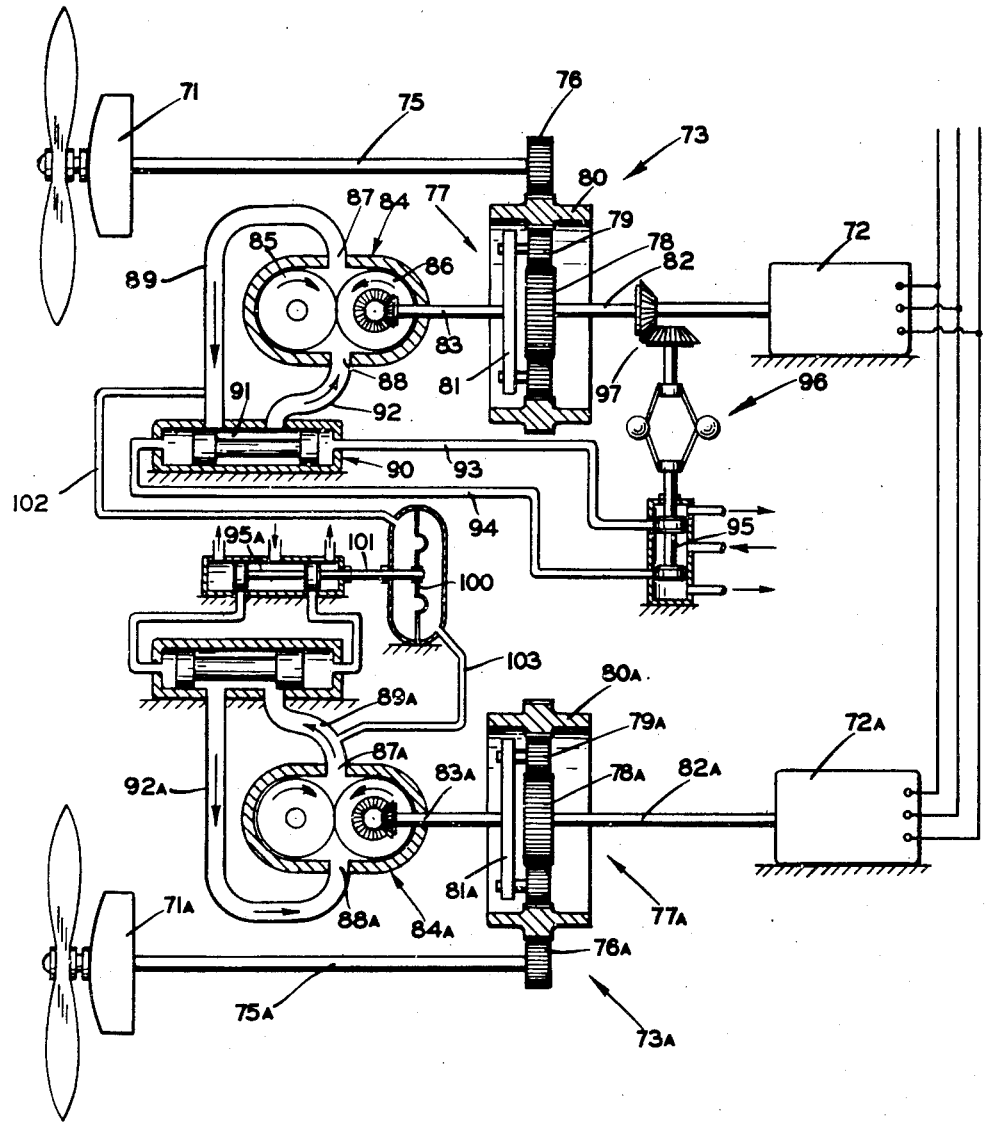

Figure 3 is a schematic drawing illustrating a third form of the invention in which the driven speeds of the alternators are controlled through a planetary gearing and the torques balanced by the relative pressures applied in a brake pump system.

Referring to Figure 1, there is indicated schematically by the numerals 1 and 1A, a pair of aircraft engines driving alternators 2 and 2A through a power transmission indicated generally by numeral 3 and 3A and controlled by a novel system which forms the subject matter of the present application.

The engine 1 drives a shaft 5 and through a variable speed drive 6 an output shaft 7 to which is drivingly connected the alternator 2. The variable speed drive indicated generally by the numeral 6 may be of any suitable type, such as a hydraulic coupling or slipping clutch arrangement well known in the art, and controlled by a speed governor indicated by the numeral 3 so as to maintain through the control line 9 the speed of the output shaft 7 and the driven speed of the alternator 2 substantially constant. The speed governor 8 may control for example, through a valve 10 the flow of fluid from a suitable source to the hydraulic coupling of the constant speed drive 6 so as to maintain the speed of the output shaft 7 substantially constant in a manner well known in the art.

A torque measuring device 11 is provided which may be of any suitable type well known in the art such as a mechanical floating gear arrangement, electrical strain gauge, or the internal oil pressure of a pump-motor combination which may be part of the drive or added to the drive system for the purposes required. The device 11 measures the torque or load applied to the shaft 7 by the alternator 2.

The power transmission 3A connecting the engine 1A and alternator 2A has similar operating parts to those described with reference to the transmission 3 and in the drawing like numerals indicate like parts. However, in the power transmission 3A, the variable speed drive 6A is controlled, not by the speed of the shaft 7A, but rather by a torque differential analyzer indicated generally by the numeral 12. The torque differential analyzer is operably connected to the torque measuring devices 11 and 11A by control lines 13 and 13A.

The torque differential analyzer 12 includes suitable means for comparing the torque applied to the shaft 7A by the alternator 2A of the slave transmission 3A as measured by the torque measuring device 11A, with that applied to the shaft 7 by the alternator 2 of the master transmission 3 as measured by the torque measuring device 11.

The torque differential analyzer 12 then controls through the operating line 14, the speed of the slave variable speed drive 6A so that the torque of the master and slave transmissions are maintained at some fixed predetermined relationship indicative of the proportion of the load to be carried by the alternators driven in the respective transmissions.

The torque differential analyzer may be a suitable electrical means for comparing the torques of the slave with the master or the same may be a suitable hydraulic balancing device or mechanical linkage for comparing the torques.

It will be seen from the foregoing that while the speed of the output shaft 7 of the master transmission is maintained substantially constant through operation of the speed governor 8 and variable speed drive 6 controlled thereby the output shaft 7A of the slave transmission is dependent upon the relative torques applied to the shafts 7 and 7A.

Thus for example, upon the torque applied to shaft 7A increasing above a predetermined balanced relation and indicative of an out of balanced relationship between the alternators 2 and 2A in which the alternator 2A tends to be driven too rapidly, it will be seen that the torque differential analyzer 12 will tend to decrease the speed at which shaft 7A is driven through the variable speed drive 6A until the alternator 2A is once again driven in synchronism with alternator 2 and assumes its proper proportion of the load.

Of course, upon the torque applied to shaft 7 increasing above the predetermined balanced relation, then the torque differential analyzer 12 tends to effect an increase in the speed at which shaft 7A is driven through the variable speed drive 6A until the alternator 2A is driven once again in balanced relation with the alternator 2.

A second form of the invention is shown in Figure 2 in which there is indicated schematically by the numerals 31 and 31A, a pair of aircraft engines driving alternators 32 and 32A through a power transmission indicated generally by numerals 33 and 33A. The engine 31 drives a shaft 35 through a constant speed drive indicated generally by the numeral 36, and which may be of any suitable type such as a hydraulic coupling, in which the ratio of input and output may be varied by the supply of coupling fluid through the conduit 37 controlled by valve 38. The valve 38 is operated by a speed governor 39 drivingly connected through gears 40 to the shaft 35. The governor is so arranged that as the speed of the shaft 35 increases above a predetermined value, the fluid supplied through conduit 37 is decreased so as to increase the slippage between the drive shaft of engine 31 and the driven shaft 35 so as to maintain a substantially constant speed at the shaft 35. The shaft 35 has a spur gear 41 which drives a planetary mechanism indicated generally by the numeral 42. The planetary mechanism includes a sun gear 43, planetary gears 44 rotatably mounted on the member 45 and a ring gear 46 with which the spur gear 41 meshes.

The sun gear 43 is connected to a shaft 47 drivingly connected to the alternator 32 while the member 45 is drivingly connected to a shaft 48 which connects the member 45 to a brake pump indicated generally by the numeral 49. The brake pump 49 includes a pair of rotary pump gears 50 and 51 and has an inlet 52 connected by a conduit 53 to an outlet 54. A restriction 55 is provided in the conduit 53, so as to provide a pressure drop across the outlet and inlet openings 52 and 54, respectively, of the brake pump 49.

The power transmission 33A connecting the engine 31A and the alternator 32A has similar parts to those described with reference to the transmission 33 and in the drawing, like numerals indicate like parts. The speed governor 39A, however, is set for a regulated speed slightly in excess of the speed setting of governor 39.

Moreover, in the conduit 53A instead of a fixed restriction corresponding to the restriction 55, there is provided a variable restriction controlled by a valve piston member 56. A servo valve 57 controls the application of fluid pressure to one side or the other of the piston 56 through conduits 58 and 59 as shown in Figure 2, so as to adjustably position the same.

The servo valve 57 is controlled by a differential pressure responsive diaphragm 60. One side of the diaphragm 60 is affected by the torque pressure from the brake pump 49 supplied through conduit 61, while the opposite side of diaphragm 60 is affected through conduit 62 by the torque pressure applied from the brake pump 49A.

In the operation of the control system shown by Figure 2, it will be seen that the constant speed drive mechanisms 36 and 36A tend to maintain the driving shafts 35 and 35A at a constant speed. However, upon the torque of one or the other of the alternators 32 and 32A as applied through the brake pumps 49 and 49A exceeding that of the other, the differential pressure applied through the diaphragm 60 will tend to move the valve 57 so as to adjust the variable restriction member 56 in a direction so as to vary the braking effect of the pump 49A and thereby increase or decrease the speed of the alternator 32A so as to bring the same into synchronism with the alternator 32 and thereby maintain the output of the two alternators in balanced relation. As shown in Figure 2, there is provided between shaft 47A and the alternator 32A, a free wheeling device 63 of conventional type so arranged that the shaft 47A may drive the alternator 32A, but in the event the speed of the engine 31A drops below a critical speed, the alternator may motor on the line without driving the shaft 47A.

A third form of the invention is illustrated in Figure 3 in which there is shown schematically by the numerals 71 and 71A, a pair of aircraft engines driving alternators 72 and 72A through a power transmission indicated generally by numerals 73 and 73A.

The engine 71 drives a shaft 75 to which there is connected a spur gear 76 driving a planetary gear mechanism indicated generally by the numeral 77. The planetary gear mechanism includes a sun gear 78, planetary gears 79, and a ring gear 80 to which the spur gear is drivingly connected. The planetary gears 79 are rotatably mounted on a member 81, while the sun gear 78 is drivingly connected to a shaft 82, which shaft drives the alternator 72.

The shaft 83 is connected to the member 81 and is drivingly connected to a brake pump indicated generally by the numeral 84 and including rotary pumping gears 85 and 86. The gear pump 84 has an outlet 87 and inlet 88. Leading from the outlet 87 is a fluid conduit 89 which leads to a valve mechanism 90 having a control piston 91 which controls the connection between the outlet conduit 89 and the inlet conduit 92 leading to the brake pump 84.

The control piston 91 is adjustably positioned by fluid pressure applied at opposite sides thereof through conduits 93 and 94 controlled by a servo valve mechanism 95. The servo valve 95 is controlled by a speed governor, indicated generally by the numeral 96 and which is drivingly connected through gears 97 to the drive shaft 82 of the alternator 72 so as to maintain a predetermined speed.

The power transmission 73A connecting the engine 71A and alternator 72A has similar parts to those described with reference to the transmission 73 and in the drawing of Figure 3, like numerals indicate like parts. However, the servo valve mechanism 95A is not controlled by a speed governor, but is instead adjustably positioned in response to movement of a differential pressure responsive diaphragm 100 which is operatively connected to the servo valve 95A through an adjustment rod 101.

One side of the diaphragm 100 is connected through a conduit 102 to the output pressure conduit 89 leading from the brake pump 84, while the opposite side of the diaphragm 100 is connected through a conduit 103 to the output pressure conduit 89A leading from the brake pump 84A. In the foregoing arrangement, it will be seen then that the speed governor 96 will tend to adjust the brake pump 84 so as to maintain a predetermined constant speed at the alternator shaft 82, while the differential diaphragm 100 will tend to adjust the brake pump 84A so as to maintain the torque applied to the alternator shaft 82A in balance with the torque applied to the alternator shaft 82 so that the alternator 72 and 72A will be driven not only at a constant speed, but also in balanced torque relationship.

While the foregoing forms of the invention have been illustrated as applied to two alternators, it will be readily seen that the same may be applied to more alternators as may be desired, by using one alternator as a master which is speed governed, while all the rest or slave alternators follow along in a predetermined balanced torque relationship so as to affect a desired disposition of load or torque between the units.

Although only three embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A device of the character described, comprising, in combination a first engine, a constant speed drive, a generator driven by said first engine through said drive, first torque responsive means subject to the torque applied through said constant speed drive to said generator; a second engine, a variable speed drive, another generator driven by said engine through said variable speed drive, said generators being electrically connected in parallel relation to output lines, second torque responsive means subject to the torque applied through said variable speed drive to said other generator, differential torque responsive means operatively affected by said first and second torque responsive means for controlling said variable speed drive so as to maintain a predetermined division of load between said generators.

2. A device of the character described, comprising, in combination a first engine, a constant speed drive, a generator driven by said first engine through said drive, first hydraulic brake pump means responsive to the torque applied to said generator; a second engine, a variable speed drive, another generator driven by said engine through said variable speed drive, said generators being electrically connected in parallel relation to output lines, second hydraulic brake pump means responsive to the torque applied to said other generator, differential hydraulic pressure responsive means operatively affected by said first and second torque responsive means for controlling said variable speed drive so as to maintain a predetermined division of load between said generators.

3. A device of the character described, comprising, in combination, a first engine, a variable speed drive, a generator driven by said first engine through said drive, first torque responsive means affected by the torque applied through said variable speed drive to said generator; a second engine, another variable speed drive, a second generator driven by said second engine through said other variable speed drive, said generators being electrically connected in parallel relation to output lines, second torque responsive means affected by the torque applied through said other variable speed drive to said second generator, differential torque responsive means operatively affected by the first and second torque responsive means for controlling one of said variable speed drives so as to maintain a predetermined division of load between said generators.

4. A device of the character described, comprising, in combination, a first engine, a variable speed drive, a generator driven by said first engine through said drive, first hydraulic brake pump means responsive to the torque applied to said generator; a second engine, another variable speed drive, a second generator driven by said second engine through said other variable speed drive, said generators being electrically connected in parallel relation to output lines, second hydraulic brake pump means responsive to the torque applied to said second generator, differential hydraulic pressure responsive means operatively affected by the first and second torque responsive means for controlling one of said variable speed drives so as to maintain a predetermined division of load between said generators.

5. A device of the character described, comprising, in combination, a first engine, a first constant speed drive, a first variable speed drive, a generator driven by said first engine through said first constant and variable speed drives, first means responsive to the torque applied to said generator through said first variable speed drive, a second engine, a second constant speed drive having a regulated speed slightly in excess of said first constant speed drive, a second variable speed drive, another generator driven by said second engine through said constant and variable speed drives, said generators being electrically connected in parallel relation to output lines, second means responsive to the torque applied to said other generator through said second variable speed drive, differential torque responsive means affected by said first and second torque responsive means for controlling one of said variable speed drives so as to maintain a predetermined division of load between said generators.

6. A device of the character described, comprising, in combination, a first engine, a first constant speed drive, a first variable speed drive, a generator driven by said first engine through said first constant and variable speed drives, first hydraulic brake pump means responsive to the torque applied to said generator through said first variable speed drive, a second engine, a second constant speed drive having a regulated speed slightly in excess of said first constant speed drive, a second variable speed drive, another generator driven by said second engine through said constant and variable speed drives, said generators being electrically connected in parallel relation to output lines, second hydraulic brake pump means responsive to the torque applied to said other generator through said second variable speed drive, differential hydraulic pressure responsive means affected by said first and second torque responsive means for controlling one of said variable speed drives so as to maintain a predetermined division of load between said generators.

7. A device of the character described, comprising, in combination, a first engine, a constant speed drive including an epicyclic gearing, a first generator, a first hydraulic brake pump, said epicyclic gearing interconnecting said first engine, first generator and first brake pump, means responsive to the driven speed of said first generator for controlling said first brake pump so as to maintain said first generator at a predetermined driven speed, a second engine, a variable speed drive including an epicyclic gearing, a second generator, a second hydraulic brake pump, said epicyclic gearing interconnecting said second engine, second generator and second brake pump, a differential hydraulic pressure responsive means affected by the hydraulic pressures from said first and second brake pumps, said differential hydraulic pressure responsive means controlling the outlet of said second brake pump so as to maintain a predetermined division of load between said generators.

8. A device of the character described, comprising, in combination, a first engine, a first constant speed drive driven by said engine, a first epicyclic gearing, a first generator, a first hydraulic brake pump, said first epicyclic gearing interconnecting said first constant speed drive to the first generator and the first brake pump; a second engine, a second constant speed drive driven by said engine and having a regulated speed in excess of said first constant speed drive, a second epicyclic gearing, a second generator, a second hydraulic brake pump, said second epicyclic gearing interconnecting said second constant speed drive to the second generator and the second brake pump; a differential hydraulic pressure responsive means affected by the hydraulic pressures from said first and second brake pumps, said differential hydraulic pressure responsive means controlling the outlet of said second brake pump so as to effect a braking action for maintaining predetermined division of load between said generators.

9. The combination comprising an alternator, a master drive for driving the alternator at a substantially constant speed, a first torque measuring device affected by the torque applied through said master drive, another alternator electrically connected in parallel relation to the first mentioned alternator, a slave drive for the second alternator, a second torque measuring device affected by the torque applied through said slave drive, and differential torque responsive means affected by said first and second measuring devices for controlling said slave drive in response to the difference in the torques applied to said alternators through said master and slave drives respectively so as to maintain said alternators in synchronism.

DONALD MALCOLM LAWRENCE.

REFERENCES CITED

The following references are of record in the file of this patent:

UNITED STATES PATENTS

| Number | Name | Date |
|---|---|---|
| 2,296,177 | Newton | Sept. 15, 1942 |